United States Patent [19]

Chou

[11] Patent Number: 5,463,471

[45] Date of Patent: Oct. 31, 1995

[54] METHOD AND SYSTEM OF COLOR HALFTONE REPRODUCTION

[75] Inventor: Daniel S. Chou, Woodinville, Wash.

[73] Assignee: Microsoft Corporation, Redmond, Wash.

[21] Appl. No.: 307,484

[22] Filed: Sep. 16, 1994

Related U.S. Application Data

[63] Continuation of Ser. No. 879,959, May 6, 1992, abandoned.

[51] Int. Cl.$^6$ .............................. H04N 1/40; H04N 1/46; H04N 1/52

[52] U.S. Cl. .................... 358/298; 358/533; 358/534; 358/536

[58] Field of Search .................... 358/298, 454, 358/456, 518, 520, 533, 534, 535, 536

[56] References Cited

U.S. PATENT DOCUMENTS

| | | | |
|---|---|---|---|
| 4,149,183 | 4/1979 | Pellar et al. | 358/534 |
| 4,499,489 | 2/1985 | Gall et al. | 358/75 |
| 4,507,685 | 3/1985 | Kawamura | 358/283 |
| 4,537,470 | 8/1985 | Schoppmeyer | 350/317 |
| 4,585,309 | 4/1986 | Jung et al. | 350/322 |
| 4,595,948 | 6/1986 | Itoh et al. | 358/75 |
| 4,924,301 | 5/1990 | Surbrook | 358/75 |
| 4,953,015 | 8/1990 | Hayasaki et al. | 358/79 |
| 4,974,067 | 11/1990 | Suzuki et al. | 358/534 |
| 5,045,931 | 9/1991 | Sakamoto | 358/534 |
| 5,055,923 | 10/1991 | Kitagawa et al. | 358/534 |
| 5,166,809 | 11/1992 | Surbrook | 358/536 |

FOREIGN PATENT DOCUMENTS

| | | | |
|---|---|---|---|
| 0444290 A3 | 9/0491 | European Pat. Off. | H04N 1/46 |
| 0204094 | 12/1986 | European Pat. Off. | H04N 1/40 |
| 3606427A1 | 8/1986 | Germany | H04N 1/46 |

*Primary Examiner*—Peter S. Wong
*Assistant Examiner*—Eric Frahm
*Attorney, Agent, or Firm*—Seed and Berry

[57] ABSTRACT

A method of color halftone reproduction with reduced moiré patterns and simplified calculations of color densities is disclosed. The method entails dividing a reproduction surface into an array of abutting halftone cells having centers aligned at a screen angle, preferably 45°, with halftone cells in adjacent rows. The halftone cells each cover an area of M abutting horizontal dots long by N abutting vertical dots wide. The various system colors are applied to the pels, as required, in color patterns centered within the halftone cells. The patterns overlap one another to adjust the hue of the reproduction at the halftone cell location to the desired hue. The method is usable with permanent reproductions, such as printed paper, or with transient reproductions, such as the image on a CRT screen.

29 Claims, 5 Drawing Sheets

| | 1 | 2 | 3 | 4 | 5 | 6 | 7 | 8 |
|---|---|---|---|---|---|---|---|---|
| 1 | 32 | 28 Y | 19 YM | 10 YMB | 9 YMB | 18 YM | 27 Y | 31 |
| 2 | 23 Y | 15 YM | 5 YMB | 1 YMB | 4 YMB | 8 YMB | 14 YM | 22 Y |
| 3 | 24 Y | 16 YM | 6 YMB | 2 YMB | 3 YMB | 7 YMB | 13 YM | 21 Y |
| 4 | 29 | 25 Y | 20 YM | 11 YMB | 12 YMB | 17 YM | 26 Y | 30 |

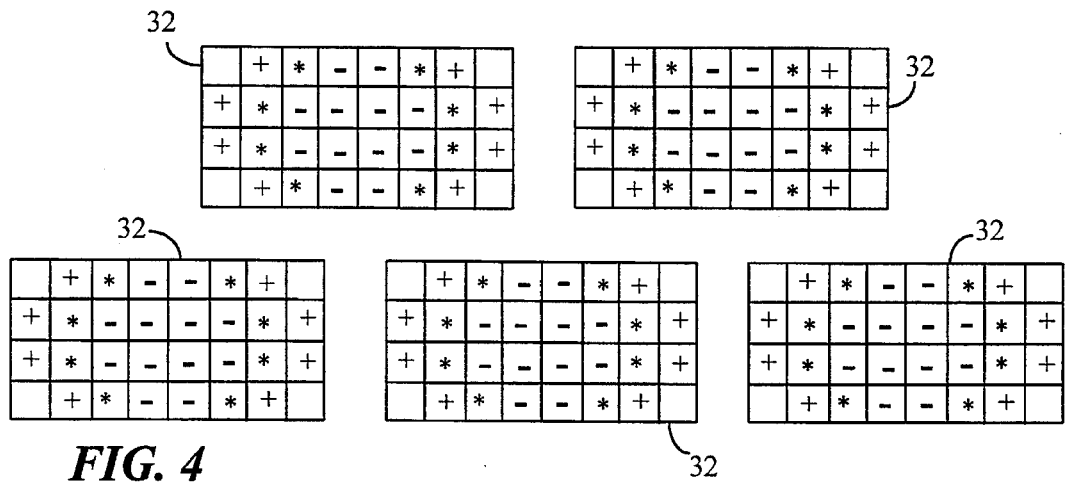
*FIG. 4*
| | 1 | 2 | 3 | 4 | 5 | 6 | 7 | 8 |
|---|---|---|---|---|---|---|---|---|
| 1 | 32 | 28 Y | 19 YM | 10 YMB | 9 YMB | 18 YM | 27 Y | 31 |
| 2 | 23 Y | 15 YM | 5 YMB | 1 YMB | 4 YMB | 8 YMB | 14 YM | 22 Y |
| 3 | 24 Y | 16 YM | 6 YMB | 2 YMB | 3 YMB | 7 YMB | 13 YM | 21 Y |
| 4 | 29 | 25 Y | 20 YM | 11 YMB | 12 YMB | 17 YM | 26 Y | 30 |
*FIG. 5*
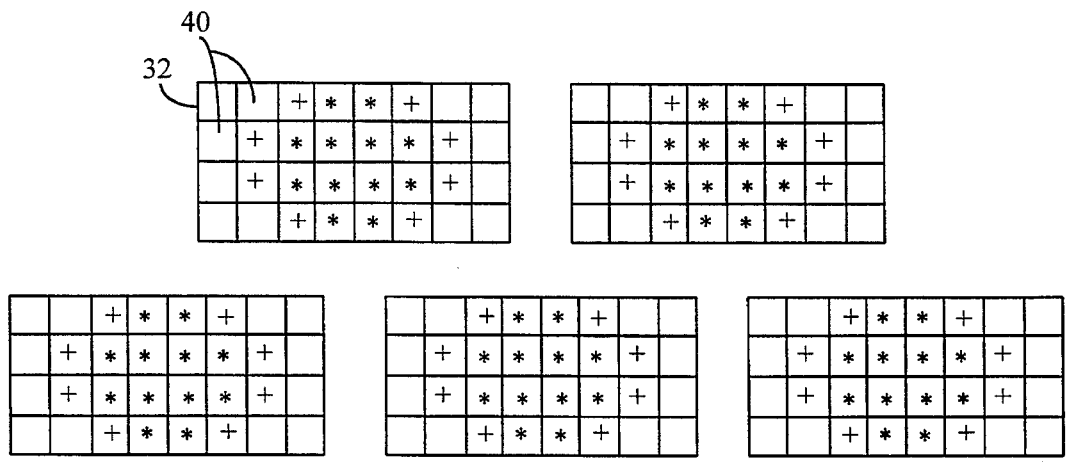
*FIG. 6*

METHOD AND SYSTEM OF COLOR HALFTONE REPRODUCTION

CROSS-REFERENCE TO RELATED APPLICATION

This application is a continuation of U.S. patent application Ser. No. 07/879,959, filed May 6, 1992, now abandoned.

TECHNICAL FIELD

This invention relates to a method and system for color halftone reproduction.

BACKGROUND OF THE INVENTION

Halftone reproduction is a well-known method of producing an image by displaying variable sized dots on a reproduction surface. By varying the size of the dots, a human eye can be made to perceive a desired image in the reproduction. In most halftone reproductions, the locations of the dots, called pels (short for "picture elements") are fixed or raster points.

An understanding of halftone reproduction is assisted by a discussion of halftone printing. In a typical black-and-white halftone printing system, an image to be reproduced is photographed through a screen which divides the image into a large number of halftone cells. The size and center-to-center spacings of these halftone cells are controlled by the screen dimensions. The resulting photographic negative is used to create a printing plate comprised of dots located at the center of the halftone cells and having sizes dependent upon the amount of black in the original image at the halftone cell locations. The printing plate dots are then inked and used to imprint a reproduction surface, thereby reproducing the image. If the space between dot centers is sufficiently small, the reproduction appears continuous to the naked eye. The quality of the reproduction depends upon the proper matching of such variables as the reproduction medium, the inks used, the dot center-to-center spacings, and the method of applying the ink onto the reproduction surface.

Color halftone printing systems are similar to black-and-white halftone printing systems. Typically, inks of three colors, usually cyan, yellow and magenta (CYM), are used. However, because of impurities in commercially available CYM inks, black ink is frequently added to assist in reproducing shades of black, producing what is called a CYMK system. Color halftone printing systems involve photographing an image through separate color screens set at different screen angles for each color and using a different color filter for each system color. The resulting color negatives are used to produce separate color printing plates. These plates are then inked with their appropriate colored ink and used to imprint the reproduction surface. As with black-and-white halftone printing, the quality of the reproduction depends upon the proper matching of such variables as the reproduction medium, the inks, the color dot center-to-center spacings, and the various amounts of the colored inks applied. However, many other factors such as the screen angles used and the match between the color filters and the ink colors are important in color halftone reproduction systems. Because of the sensitivity of the human eye to color hues, proper matching between all factors is more critical.

Color halftone reproduction has been adapted for use with digital computers, CRTs, and color printers. Prior art digital color halftone reproduction systems have used image scanners to digitize an original image; have included networks for altering the color hues of the image; have incorporated CRTs for enabling an operator to observe the effects of the color alterations; have included methods for simulating various screen angles; and have included methods for calculating the amounts of each color ink required to correctly reproduce the image. However, as personal computer systems and low-cost color printers have become more common, a need has developed for a system of creating high-quality halftone reproductions using these components.

In prior art color halftone printing systems the individual color screens are orientated at different screen angles to avoid excessive overlap of the various inks. FIG. 1 illustrates the prior art technique of using multiple screen angles. While different screen angles may be used, the yellow dots are frequently printed at a yellow screen angle 2 of 90°, the black dots at a black screen angle 4 of 45°, the magenta dots at a magenta screen angle 6 of 75°, and the cyan dots at a cyan screen angle 8 of 105°. These particular screen angles have been found to assist in creating a pleasing reproduction image. However, the resulting ink dots of different colors have variable center-to-center spacings and overlap seemingly at random. This variability produces some areas in the reproduction having high dot densities and a lot of ink and other areas with low dot densities and little ink. If these dot variations become visible, a highly objectionable interference effect known as a moiré pattern is observed.

Prior art halftone color printing methods produce high-quality color prints without visible moiré patterns if the center-to-center spacings between color dots of the same color is small, say less than about 1/1200th dots per inch. As the spacings and dots become larger, the moiré pattern becomes more pronounced and, consequently, the quality of the reproduction deteriorates. Low-cost color printers such as those often used with personal computers, typically can print no more than about 300 dots per inch, resulting in highly visible moiré patterns using prior art techniques.

Another problem with prior art color halftone printing systems is that the calculations of how much of each color ink to deposit on the reproduction surface to accurately reproduce an image, the so-called color separation calculations, are very involved. In part, this is because the various color dots use different screen angles and thus interact in a hard-to-determine manner. Since the central processing units (CPUs) of common personal computers are relatively slow, and users want printing to occur with little or no delay, the required calculations are not performed as quickly as is often desirable.

Therefore, there has existed a need for a method and system of performing color halftone reproduction such that personal computers and low-resolution printers and CRT displays can produce acceptable images and such that the computational complexity of the ink density calculations, or color dot density calculations when the reproduction surface is a CRT, is reduced.

SUMMARY OF THE INVENTION

It is an object of the present invention to provide an improved system for applying color dots to a reproduction surface during color halftone reproduction.

It is another object of the present invention to provide such a system for applying color dots to a reproduction surface so that the visibility of moiré patterns is reduced.

It is still another object of the present invention to provide a method of color halftone printing wherein the complexity of ink density calculations is reduced.

It is yet another object of the present invention to provide a color halftone reproduction technique wherein all color dots use the same screen angle.

The above and other objects of the present invention which will become apparent to those skilled in the art as the invention is described more fully below, are in preferred embodiments achieved by a method and system of displaying color dots on a reproduction surface to produce a color halftone reproduction. The reproduction surface is divided into a large number of abutting halftone cells organized into rows; these rows are offset from one-another so that halftone cells in adjacent rows align at a common screen angle. The halftone cells themselves are N pels high and M pels wide, where N and M are integer values. Color images are produced by inking portions of each halftone cell with colored inks that overlap, as required, to produce the desired hue a raster pattern of in each halftone cell.

According to the preferred embodiment described herein, the reproduction surface is partitioned into an array of rows of abutting halftone cells having centers that align at a screen angle of 45°. The individual halftone cells cover an area defined by N pels by M pels, where N=½M. The halftone cells are preferably imprinted with CYMK inks such that no more than two primary color inks, plus possibly black, are added to each halftone cell. The various inks are applied using a print pattern in which a first color ink, the color which has the greatest impact on the desired hue, is applied to the largest portion of the halftone cell; a second color ink, if and as required, is printed over some of the same pels as the first color; and where black is printed, if and as required, over some of the same pels as the first and second color inks. The various inks are beneficially applied such that they appear to diverge from the centers of the halftone cells.

BRIEF DESCRIPTION OF THE DRAWINGS

FIG. 4 illustrates the imprinting ink dots in the halftone cells to produce an image in accordance with the preferred embodiment described herein.

FIG. 5 is an individual halftone cell in FIG. 4 showing the overlap printing of colored inks.

FIG. 6 illustrates the system of FIG. 4 wherein the reproduced image has a lighter hue.

DETAILED DESCRIPTION OF THE INVENTION

The present invention relates to a method and system for reproducing an image using color halftone reproduction techniques. The present invention is usable with both hardcopy mediums such as paper, color film, and transparencies, and also with transient images such as those on a computer CRT display or a television monitor. However, the preferred embodiment described herein is a method and system for use with a personal computer and a low resolution color printer.

In the preferred embodiment a reproduction surface is divided into an array of small areas, referred to as halftone cells, that are arranged into abutting rows. The rows, in turn, abut other rows such that the centers of the halftone cells in adjacent rows align at an angle of 45°. The size of the halftone cells are selected to encompass an N×M array of potential color dots, or pels, where M=½N.

By inking selected pels within the halftone cells with colored inks, the eye is caused to perceive a color hue at the halftone cell location. The composite image perceived from all of the halftone cells results in a reproduction of the desired image. The selecting of the particular pels to be inked requires the associating of sections of the bit-mapped image, referred to as cell equivalents, with the half-tone cells. The cell equivalents contain the parts of the image that are to be perceived in the halftone cells. The image data of the cell equivalents is converted to ink densities which equate to the percentage of each halftone cell which should be covered by each of the system colors to produce the desired image. The pels to be printed to meet the ink density calculations are then determined using the inventive system of overlapping colors, as required, at pels in the half-tone cells.

In the preferred embodiment the reproduction surface is white paper. The part of the paper to be printed is divided into halftone cells, each cell comprised of thirty-two pels arranged into as 4×8 pel array. The preferred system uses CYMK inks, and no more than two colors, plus possibly black, are printed in each halftone cell.

Figure 1:
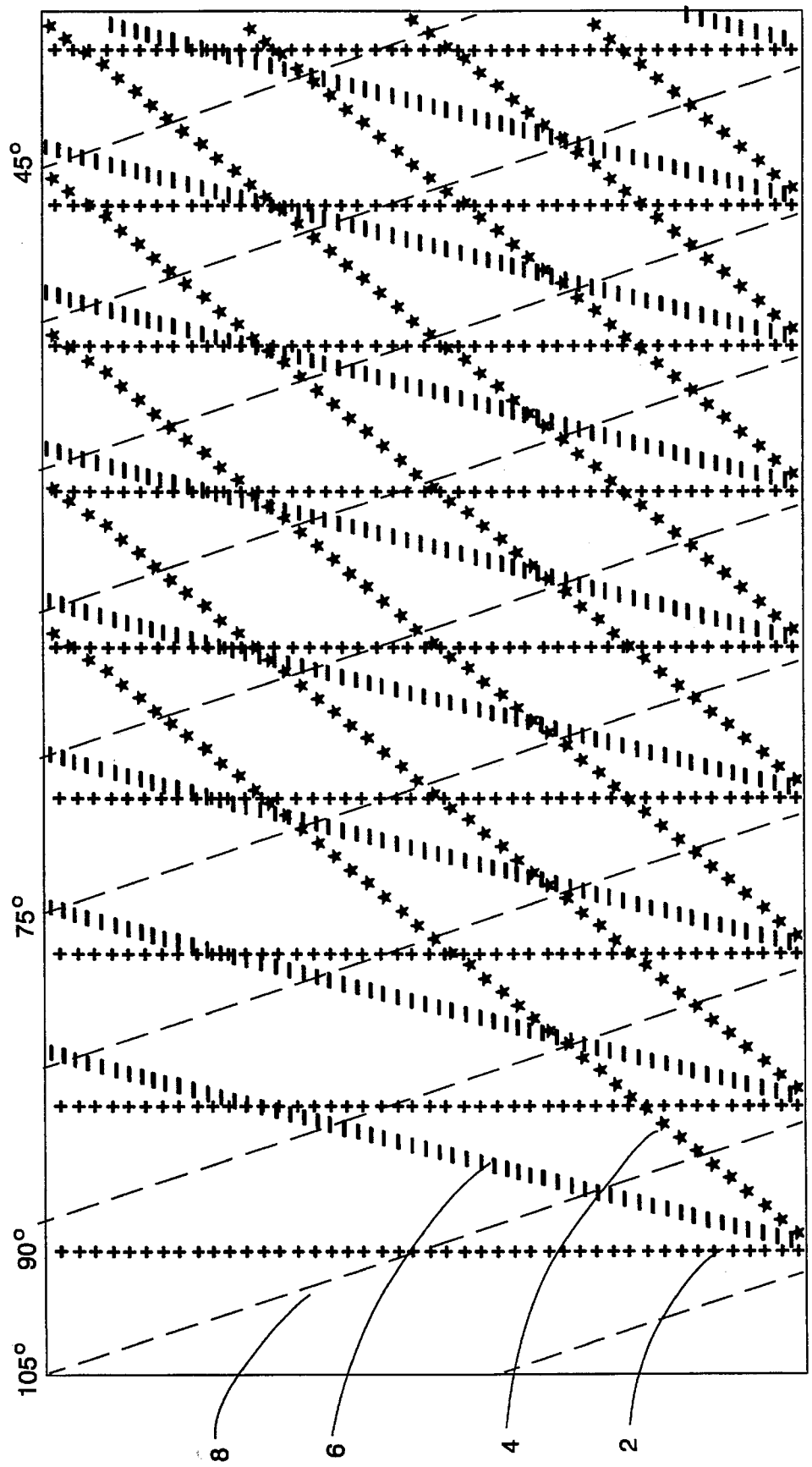
FIG. 1 illustrates the application of color dots along different screen angles in a typical prior art color halftone printing system.
Figure 2:
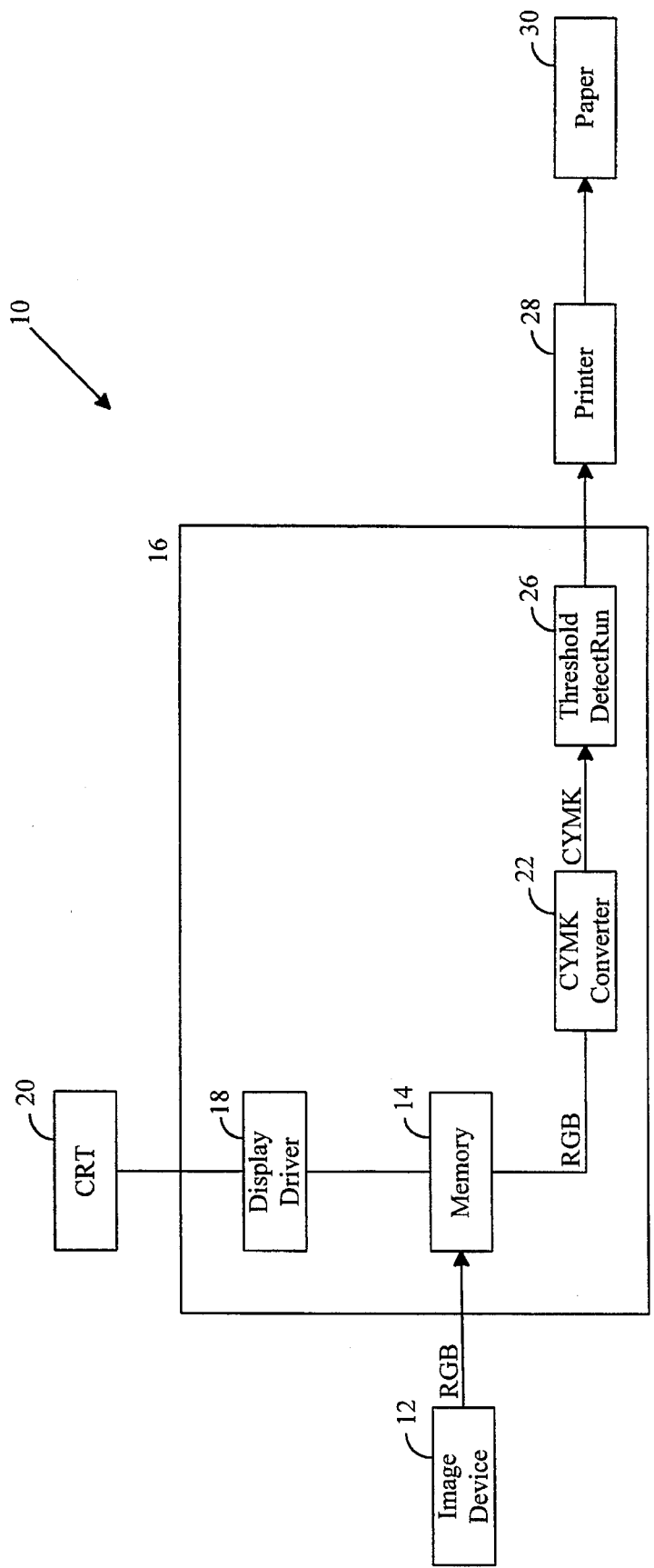
FIG. 2 is a block diagram of an apparatus suitable for implementing the preferred embodiment of the present invention.

FIG. 2 illustrates an apparatus 10 suitable for implementing the preferred embodiment. Included is an image device 12 that is used for scanning a picture to be reproduced and for outputting a bit-mapped image comprised of red, green, and blue (RGB) digital values, which are stored in a memory 14 of a computer 16. A Compaq 386 personal computer is used in the preferred embodiment. The memory applies the bit-mapped RGB values to a display driver 18 which enables a cathode ray tube (CRT) 20 to display the scanned-in image. A NANAO FlexScan CRT is used in the preferred embodiment. The bit-mapped image within the memory is also applied to a CYMK converter 22 which converts the RGB digital values into their equivalent cyan-yellow-magenta-black (CYMK) values. The converted outputs from the CYMK converter 22 are applied to a Threshold DetectRun circuit 26 which determines which pels in each halftone cell the printer 28 will print on the paper 30. A QMS Color Script color laser printer is used in the preferred embodiment. The printer preferably is of the type which sweeps a printing position, referred to as the cursor, across the paper. By printing the system colors in the pels according to the results of the ink density calculations as the cursor moves across the paper, the printer produces a color halftone image. The memory, CYMK converter, and Threshold DetectRun blocks are implemented in the preferred apparatus using the personal computer's memory and its CPU under the control of a software program. It is to be noted that the above-described components may be replaced by other components, and that the inventive method can be implemented using a completely different apparatus.

Figure 3A:
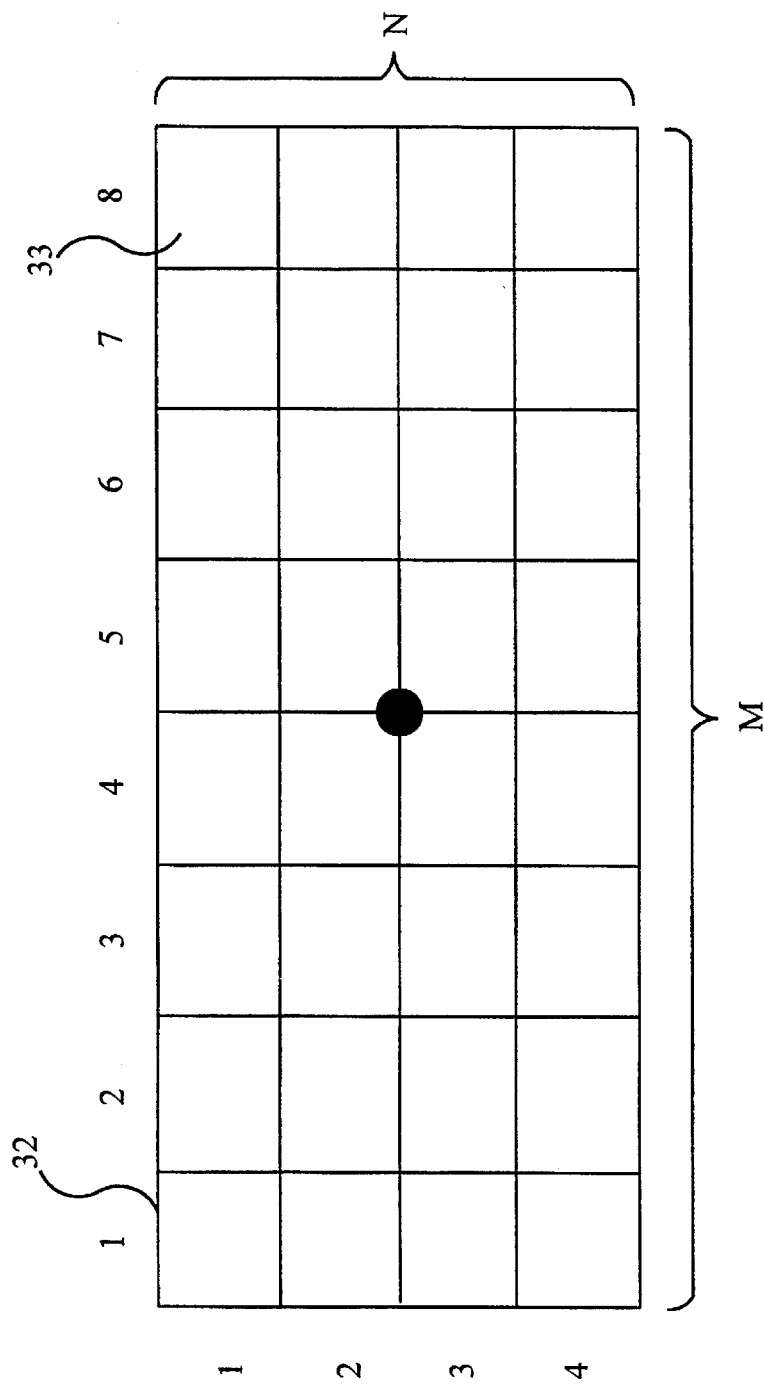
FIG. 3A illustrates a halftone cell comprised of an 8×8 array of pels in accordance with the preferred embodiment described herein.

As indicated, preferred embodiments of the present invention involve the controlled printing of small ink dots. While the smallest dot that a printer can make varies between printers, a typical low-cost color dot printer can print about 300 dots per inch (DPI), with each dot being about $\frac{1}{120}$th inch in diameter. Thus, overlap between adjacent dots may occur. In the preferred embodiment described herein, the smallest printable dot controls the size of the halftone cells. Referring to FIG. 3A, each halftone cell 32 represents an area of the paper whose length is equal to the size of N abutting horizontal dots 33 and whose width is equal to the size of M abutting vertical dots 33. The optimum halftone cell dimension depends upon the printer being used, and testing may be required to determine the optimum size for a given printer. For the A10 printer used in the preferred embodiment, which prints 300 dots per inch vertically and horizontally with each dot about 1/120 inch in diameter, very good results are obtained using a halftone cell size of 4×8 pels.

The optimum halftone cell size involves a tradeoff between a desirably large number of potential color variations achievable in a single halftone cell against the coarseness of the reproduced output. A useful guide to assist testing and selection of the desired size cell is that the number of halftone cells per resolution unit, called the "frequency," should be greater than 48 for a quality output, with about 34 being the minimum acceptable value. Frequency can be determined from the formula:

$$R = \text{Sqrt}((X/X_c)^2 + (Y/Y_c)^2)$$

where:

X=Device pels per inch in X (width) direction
Y=Device pels per inch in Y (height) direction
Xc=Halftone Cell width in device pels
Yc=Halftone Cell height in device pels The resolution unit length is typically inches.

Figure 3B:
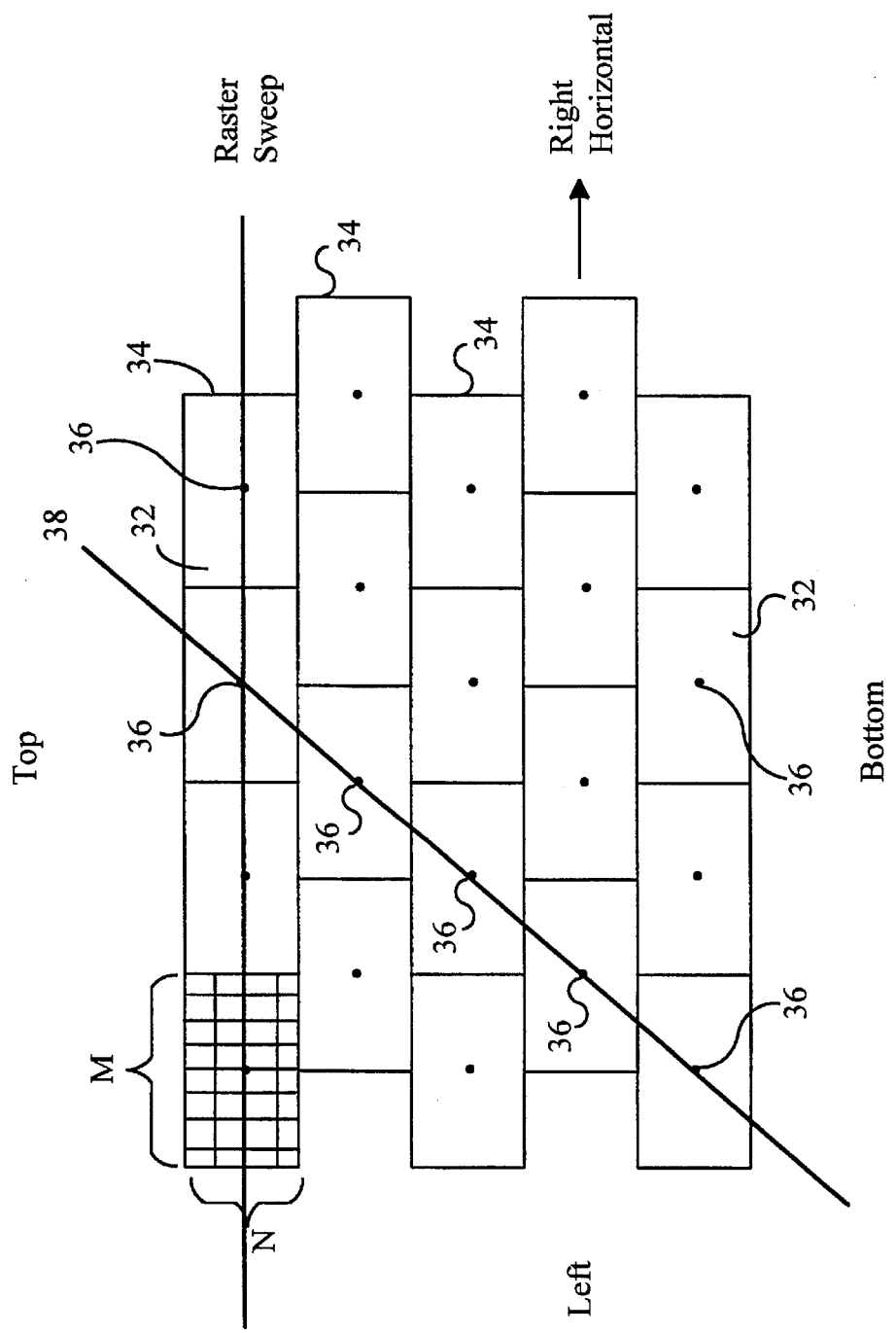
FIG. 3B illustrates how halftone cells are tiled over a reproduction surface according to the preferred embodiment described herein.

Referring now to FIG. 3B, the halftone cells 32 can be imagined tiled over the area of the paper which is to be printed. Each halftone cell abuts at least one adjacent halftone cell to form rows 34. The rows abut other rows such that the centers 36 of the halftone cells in adjacent rows align along a 45° angle 38. Associated with each halftone cell is a part of the image to be reproduced, the cell equivalent (not shown). In the preferred embodiment described herein, the image is stored in the memory 14 as an array of RGB color values which must be converted by the CYMK converter 22 to CYMK ink values. The CYMK ink values simply represent the RGB magnitudes converted into CYMK magnitudes. The CYMK ink values must then be converted to ink densities, or the percentage of the halftone cells covered with each ink, prior to the printing of the pels. The conversion of the CYMK ink values into ink densities is subject to a large number of variables including the color of the paper, the color of the inks used, the quality of the inks, the resolution of the image, the size of the smallest ink dot printable, and the ink application method.

In the preferred embodiment described herein, each halftone cell is printed using no more than two of the three ink colors, plus possibly black, as required. Thus, the preferred embodiment system produces only eight colors: the four ink colors of cyan, magenta, yellow, and black; the three colors derived from overlapping two ink colors, red, green, and blue; and the color of the paper, assumed to be white. Other colors must be simulated by combining and arranging the available colors in such a way that the eye will perceive additional colors.

The method of applying ink dots employed in the preferred embodiment is shown in FIG. 4. Assume for illustrative purposes that a dark orange is to be perceived from the halftone cells 32. Using CMYK inks, dark orange is comprised of 0% cyan, 61% magenta, 87% yellow, plus some percentage of black to produce the desired blackness. These percentages equate to the degree that the halftone cell is covered by each ink. Since the primary hue in orange is yellow, each of the halftone cells in FIG. 4 has a larger number of pels printed with yellow ink than with magenta ink. With reference to FIG. 4, pels printed with yellow ink are shown with pluses (+), stars (*), or dashes (-). Pels are also printed with magenta ink at the halftone cell locations with stars (*) and dashes (-). The combination of the yellow and magenta ink dots create an orange hue whose "yellowness" depends upon the number of pels covered by (+)'s but not covered by (*)'s or (-)'s. Overprinting parts of the pels printed with both yellow and magenta inks, at locations shown with dashes (-), are pels printed with black ink that control the darkness of the perceived orange color. According to the preferred embodiment, the various inks are printed in somewhat elliptical patterns substantially centered at the centers of the halftone cells. Thus the color inks appear to diverge from the center of the halftone cells.

The overlapping of the colored inks is shown in more detail in FIG. 5, an individual halftone cell of FIG. 4. As shown in FIG. 5, the individual halftone cells are, as previously indicated, comprised of 32 color cells. The color cells are numbered 1 through 32 in a generally elliptical pattern emanating from the center of the cell. As discussed in more detail below, the specific pattern illustrated in FIG. 5 may be varied from that shown, and testing for the specific printer and inks being used may dictate use of more or less of a particular ink to obtain the desired hue. The orange of FIG. 4 is comprised of 87% yellow. Since there are 32 squares, 87% of them would ideally be colored with yellow ink. This 87% coverage of yellow corresponds, when rounded up, to 28 color cells. This is shown in FIG. 5 by color cells 1 through 28 containing a "Y" to designate yellow ink. In a similar manner, the desired orange is comprised of 61% magenta, which corresponds to an area coverage of approximately 20 of the 32 colored dots. This is shown by color cells 1 through 20 containing an "M" to designate that magenta is printed at those locations. An arbitrary coverage of black is shown by a "B" contained in color cells 1 through 12, designating that those color cells are printed with black.

FIG. 6 shows the halftone cells 32 of FIG. 4 producing a much lighter shade of orange. Since the same orange color is desired, the CMY values of 0% cyan, 61% magenta and 87% yellow continue to apply. Since a lighter orange is desired, no black ink is printed, denoted by the absence of dashes (-). Additionally, to produce a lighter shade of orange than is possible by simply removing the black ink, the halftone cells are not as fully covered with ink, and thus the underlying whiteness of the paper shows, as at locations 40. The density ratio of magenta and yellow preferably remains generally the same, leaving more white space. By controlling the scope of ink coverage of the halftone cells, and by adding or removing black ink, the darkness of the halftone cells can be varied over a wide gamut.

To print a given color image, that image must be converted into inks applied to the pels. Since color halftone reproductions use only a limited number of color dots, the attainable hues are limited in number. In the preferred embodiment, it is desirable to cause the hues to match as closely as possible the hue of the desired image. This requires that the amount of each color ink density applied to the halftone cells change in as small increments as possible, equivalent to a pel, as the hue of the desired image changes. According to the preferred embodiment described herein, the ink density changes are equally spaced, i.e., the number of pels printed in a halftone cell varies nonlinearly with hue changes in the image. This is preferably accomplished by storing, for each system color, equally spaced sequential tone threshold values for each of the N×M pel positions in the halftone cell, comparing the threshold value of each pel with the density magnitude of that color component ideally produced in the halftone cell; and printing a color ink dot at each pel having a threshold value less than the magnitude of the color component. Because the color preferably diverges from the centers of the halftone cells, the threshold values for the N×M pel positions are preferably assigned such that pels having adjacent threshold values map into the halftone cell so that the color grows from the halftone cell centers as the magnitude of the color component increases.

The above can be described by a pseudo-C code:

hues for the various ink combinations and the RGB values for a given image, mathematical formulas or simple look-up tables could be used to develop the ink densities. This technique is used in the preferred embodiment described herein.

The use of the look-up tables and mathematical formulas to develop ink densities is subject to a large number of variables. Referring again to FIG. 5, it should be noted that the 87% area coverage of yellow, which mathematically equates to 27.84 color cells, has been rounded up to 28. However, depending upon many factors such as the inks used and the coloring of the background paper or dot grain, another number of blocks, such as 30, may be preferred to obtain the desired orange color. Additionally, in some applications the round-up or round-down (halftone cell dot gra-

```
ThresholdIndexY = 0;
for (Y = 0; Y < Destination_Height: Y++){
    ThresholdIndexX = 0;
    for (X = 0; X < Destination_Width; X++){
        CMYK = CMYKDyesAmount;
        if (C ≦ Threshold_Array Cyan[ThresholdIndexY][ThresholdIndexX])
            [C]){
            Print Cyan at the halftone cell location:
        }
        }
        if (M ≦ Threshold_Array Magenta[ThresholdIndexY]
            [ThresholdIndexX]{
            Print Magenta at halftone cell location;
        }
        if (Y ≦ Threshold_Array Yellow[ThresholdIndexY]
            [ThresholdIndexX])
            Print Yellow at halftone cell location;
        {
        }
        if (K ≦ Threshold_Array Black[ThresholdIndexY][ThresholdIndexX])
            Print Black at halftone cell location;
        }
        if (++ThresholdIndexX >= ThresholdArrayWidth){
            ThresholdIndexX = 0;
        }
    }
    if (++ThresholdIndexY >= ThresholdArrayHeight){
        ThresholdIndexY = 0;
    }
}
``` where ThresholdIndexY and ThresholdIndexX together select the particular area of the halftone cell, CMYK represents an array of C, M, Y and K values for the image to be reproduced, and Threshold$_{13}$Array CMYX [Threshold Index Y][Threshold Index X] is the dye threshold value for the pel at that halftone cell location.

The above process requires that the effects on the perceived hue of the various possible ink combinations are known, that the various image RGB color components are known, and that those RGB values can be converted to ink densities. While specifics of these requirements are beyond the scope of the present invention, the prior art has techniques for their determination. For example, when using a low-resolution color printer the effects on the perceived hue of all possible ink combinations can be estimated by printing samples of many of the possible pel combinations for each system color, measuring the resultant color gamut, storing the measured values in a lookup table, and interpolating the stored values as required to arrive at the final perceived hue. The image color component determinations can be obtained by scanning an image using various RGB color filters to create RGB signals, digitizing the RGB signals, and storing the digitized values in memory. Finally, given the perceived dation) errors and the number of color cells printed with a given ink may not adequately reproduce the desired color tone. If this is the case, a corrective step may be used to increase or decrease the number of color cells to such a degree that the desired color can be reproduced.

It is to be understood that although numerous characteristics and advantages of the present invention have been set forth above with respect to a preferred embodiment, the disclosure is illustrative only and changes may be made in detail without departing from the spirit of the invention. Therefore, the scope of the invention is to be limited only by the appended claims.

I claim:

1. A method of color halftone reproduction for producing a selected image on a reproduction surface, comprising the steps of
    (a) partitioning the reproduction surface into abutting halftone cells, each halftone cell being dimensioned to encompass an array of pels and including a center, said cells being grouped into rows that are organized such that the centers of said halftone cells in adjacent rows align at a common screen angle; and
    (b) determining the magnitudes of a plurality of system colors to be applied in a selected halftone cell to reproduce a desired hue of the selected image at the area corresponding to said selected halftone cell; and (c) creating a raster pattern in said selected halftone cell by applying the plurality of system colors in an overlapping fashion over portions of said selected halftone cell such that said portions depend upon the determined magnitudes of said system colors, and wherein the portion for one of the system colors completely encompasses the portion for another one of the system colors.

2. The method according to claim 1 wherein said step of applying system colors includes the step of applying the colors in patterns substantially centered at said center of said selected halftone cell.

3. The method according to claim 2 wherein the step of applying system colors over portions of the reproduction surface includes imprinting colored inks at said pels of the selected halftone cell.

4. The method according to claim 2 wherein the step of applying system colors over portions of the reproduction surface includes the steps of:

(e) assigning tone density threshold values for each of said system colors to a plurality of said pels of the selected halftone cell;

(f) comparing said determined magnitude of system colors with said assigned tone density threshold values for each of said system colors; and (g) imprinting colored inks at said pels of the selected halftone cell having density threshold values less than said determined magnitude of said system colors.

5. The method according to claim 4 wherein said common screen angle is substantially 45°.

6. The method according to claim 4 wherein the step of imprinting colored inks at said pels includes imprinting no more than two colored inks in said selected halftone cell.

7. The method according to claim 6 wherein said step of imprinting no more than two colored inks includes selected the colored inks being imprinted from a group comprised of cyan, magenta, and yellow.

8. The method according to claim 7 further including imprinting black ink at said portions of said selected halftone cell.

9. The method according to claim 1 wherein said step of applying the plurality of system colors over portions of said selected halftone cell includes the step of illuminating a plurality of pels.

10. The method according to claim 8 wherein the step of applying system colors over portions of said selected halftone cell includes the steps of:

(e) assigning threshold values for each of said system colors to a plurality of said pels of said selected halftone cell;

(f) comparing said determined magnitude of said system colors with said assigned threshold values for each of said system colors; and (g) illuminating pels having threshold values less than said determined magnitudes of said system colors.

11. The method according to claim 10 wherein said common screen angle is substantially 45°.

12. A method of reducing moiré patterns in a halftone reproduction of a selected image on a reproduction surface comprising the steps of:

(a) partitioning the reproduction surface into abutting halftone cells arranged into abutting rows which are organized such that the centers of said halftone cells in adjacent rows align at a common screen angle;

(b) determining the magnitudes of a first, second, and third system color values needed in each halftone cell to reproduced a desired hue of the image area corresponding to each halftone cell;

(c) distributing said first system color over each halftone cell according to the magnitude determined for the first system color value;

(d) distributing said second system color over each halftone cell according to the magnitude determined for the second system color value;

(c) distributing said third system color over each halftone cell according to the magnitude determined for the third system color value; and (f) wherein said first, second, and third system colors are distributed in raster patterns within said halftone cells substantially centered at said centers of said halftone cells, and wherein for each halftone cell, the raster pattern for one of the system colors completely encompasses the raster pattern for another one of the system colors.

13. The method according to claim 12 wherein the step of distributing said first, second, and third system colors within each halftone cell includes the step of printing colored ink dots.

14. The method according to claim 13 wherein said step of printing colored ink dots includes the steps of:

(g) assigning density threshold values for said first, second, and third system colors to a plurality of pels;

(h) comparing said determined magnitudes of said first, second, and third system colors with said assigned threshold values for each of said system colors; and (i) printing colored inks corresponding to said first, second, and third system colors at those pels having threshold values less than said determined magnitudes of said system colors.

15. The method according to claim 14 wherein said common screen angle is substantially 45°.

16. The method according to claim 15 wherein the step of determining the magnitudes of said first, second, and third system color values needed in each halftone cell to reproduce the desired hue of the image includes determining nonzero magnitudes for only two system colors in each halftone cell.

17. The method according to claim 16 wherein said two system colors are selected from a group comprised of cyan, magenta, and yellow.

18. The method according to claim 17 further including imprinting black ink at said pels as required to achieve the desired hue of each halftone cell.

19. A system of color halftone reproduction for producing a selected image on a reproduction surface of a display device, comprising:

means for partitioning the reproduction surface into abutting halftone cells, each halftone cell being dimensioned to encompass an array of pels and including a center, the cells being grouped into rows that are organized such that the centers of the halftone cells in adjacent rows align at a common screen angle; and a color converter that determines the magnitudes of a plurality of system colors to be applied in a selected halftone cell to reproduce a desired hue of the selected image at the area corresponding to the selected halftone cell; and means for creating a raster pattern in the selected halftone cell by applying the plurality of system colors in an overlapping fashion over portions of the selected halftone cell such that the portions depend upon the determined magnitudes of the system colors, and wherein the portion for one of the plurality of system colors completely encompasses the portion for another one of the plurality of system colors.

20. The system according to claim 19 wherein the means for applying system colors includes means for applying the colors in patterns substantially centered at the center of the selected halftone cell.

21. The system according to claim 19 wherein the means for applying system colors over portions of the reproduction surface includes a printer that imprints colored inks at the pels of the selected halftone cell.

22. The system according to claim 19 wherein the means for applying the plurality of system colors over portions of the selected halftone cell includes a display device that illuminates a plurality of pels.

23. The system according to claim 19 wherein the means for applying system colors over portions of the reproduction surface includes:

a threshold detector that assigns tone density threshold values for each of the system colors to a plurality of the pels of the selected halftone cell and compares the determined magnitude of system colors with the assigned tone density threshold values for each of the system colors; and a display device that applies the system colors at the pels of the selected halftone cell having density threshold values less than the determined magnitude of the system colors.

24. The method according to claim 1 wherein the applying step includes applying the system colors such that the portion for one of the system colors completely encompasses the portions for the other system colors.

25. The method according to claim 1 wherein the applying step includes applying the system colors such that each portion forms a non-linear shape.

26. The method according to claim 12 wherein the system colors are distributed such that the patterns one of the system colors completely encompasses the patterns for the other system colors.

27. The method according to claim 12 wherein the system colors are distributed such that each pattern forms a non-linear shape.

28. The method according to claim 19 wherein the applying means includes means for applying the system colors such that the portion for one of the system colors completely encompasses the portions for the other system colors.

29. The method according to claim 19 wherein the applying means includes means for applying the system colors such that each portion forms a non-linear shape.

* * * * *

UNITED STATES PATENT AND TRADEMARK OFFICE
CERTIFICATE OF CORRECTION

PATENT NO.    :   5,463,471
DATED         :   October 31, 1995
INVENTOR(S)   :   Daniel S. Chou It is certified that error appears in the above identified patent and that said Letters Patent is hereby corrected as shown below:

In column 12, claim 26, line 13, please delete "patterns" and insert therefor --pattern for--.

Signed and Sealed this

Sixth Day of February, 1996

Attest:

BRUCE LEHMAN

*Attesting Officer*    Commissioner of Patents and Trademarks